Figure 1:
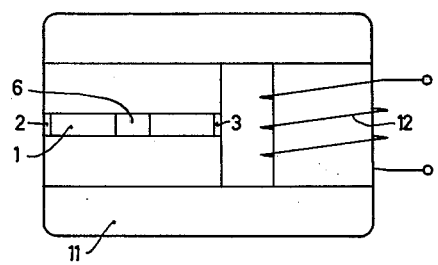

March 4, 1958 F. KUHRT 2,825,858
BROAD-AREA RESISTANCE BODY FOR HALL GENERATORS
Filed Aug. 16, 1955

2,825,858
BROAD-AREA RESISTANCE BODY FOR HALL GENERATORS

Friedrich Kuhrt, Nurnberg, Germany, assignor to Siemens-Schuckertwerke Aktiengesellschaft, Berlin-Siemensstadt and Erlangen, Germany, a corporation of Germany Application August 16, 1955, Serial No. 528,579

Claims priority, application Germany August 20, 1954

11 Claims. (Cl. 317—235)

My invention relates to Hall-voltage generating devices and has for its general object to improve such devices as regards magnitude, characteristic and economy of the Hall voltage available when the output circuit of such a device is used for energizing a current-consuming load.

When an area or wafer-shaped resistance body is traversed by a current I and is simultaneously subjected to a magnetic field having a component B perpendicular to the direction of the electric current flow, the so-called Hall effect will occur. This effect manifests itself by the phenomenon that two respective points located opposite each other on the two edges of the resistance body that are parallel to the direction of the current flow, which points have the same electric potential when the magnetic field is zero, will exhibit a difference in potential when the magnetic field is effective simultaneously with the flow of current through the resistance body. This potential difference, the so-called Hall voltage, can be taken off the resistance body by means of respective Hall electrodes located on the just-mentioned two points. The Hall voltage $U_h$ is determined by the equation:

$$U_h = R_h \cdot \frac{B \cdot I}{d}$$

wherein $R_h$ is the so-called Hall constant which is a property of the resistance material, and wherein $d$ denotes the thickness of the wafer-shaped resistance body. In this equation, $U_h$ denotes the no-load Hall voltage; that is, the equation is based on the assumption that the output circuit connected to the two Hall electrodes is not subjected to any load. Besides, the equation is accurately applicable only for a resistance body whose length L is infinite relative to its width W. For finite value of the ratio of length L to width W, a lower value ($U_{ho}$) of the no-load Hall voltage will obtain.

Investigations concerning the Hall voltage have been conducted in the recent past mainly with resistance bodies formed of germanium. In comparison with other substances, the germanium devices exhibit a considerably larger Hall voltage. However, the Hall effect could be utilized only under the condition that no load was imposed upon the Hall voltage. It was necessary to either apply a compensating method by comparing the Hall voltage with a series-opposed voltage of another source, or to use amplifiers with an input circuit of particularly high ohmic resistance. For that reason, the Hall effect heretofore has been mainly of scientific interest only.

More recently there have been developed a group of substances which have made it possible for the first time to improve the Hall effect relative to the applicability of a current load so that this effect can now also be utilized for technical purposes. As a result, a novel and useful circuit component for various purposes of electrical engineering has been provided. These devices, called "Hall generators" are equipped with resistance bodies of semiconducting compounds having a particularly great carrier mobility; that is, this mobility is larger than 6000 cm.²/volt sec. Particularly suitable for such purposes are semiconducting compounds of the type $A_{III}B_V$, namely compounds of one of the elements aluminum, gallium, indium, from the third group, sub-group $b$, with one of the elements phosphorus, arsenic, antimony, from the fifth group, sub-group $b$, of the periodic system of elements. It has been proposed to design the current supply terminals or electrodes of such semiconducting resistor bodies so that they form a line- or area-contact with the resistance body. Preferably the current supply terminals have been given such a length that they extend over the entire adjacent edge of the resistance body in order to obtain a best advantageous utilization of the resistance body relative to the desired Hall effect. It has further been proposed to design the above-mentioned Hall electrodes not as point contacts but to give them a line- or area-contact along the resistor edges that are parallel to the flow of electric current. With respect to these proposals of providing line- or area-shaped terminals and Hall electrodes of appreciable length, reference may be had to the co-pending application of H. Weiss for Hall Voltage Generators, Serial No. 491,976, filed March 3, 1955, and assigned to the assignee of the present invention.

It has been found, however, that Hall generators having a resistance body of such a high-mobility substance with line- or area-contact at the terminals, still leave much to be desired as regards reliability, electrical characteristic and economy. In some cases, the Hall voltage was found to lack the desired accuracy in responding proportionately to changes in electric current or magnetic field controlling the resistance body. In other cases, the magnitude of the Hall voltage was found to be insufficiently small. It also appeared desirable to minimize the size of the semiconductor body required for a given performance and thus to permit a reduction in size of the entire device including the magnetic field system.

It is, therefore, a more specific object of my invention to devise a resistance body, formed of the above-mentioned substances of high carrier mobility for Hall generators, that secures a particularly favorable utilization of the Hall effect, namely a largest possible Hall voltage as well as a linear proportionality of the Hall voltage to the factors B and I when the output circuit of the Hall generator is subjected to a current load, while simultaneously maintaining the amount of semiconductor material in the resistance body at a minimum.

While the just-mentioned requirements for largest possible Hall voltage and for smallest possible amount of semiconductor material appear mutually contradictory, I have discovered that there exists a narrow range for a critical dimensional proportion within which these requirements are simultaneously satisfied to an optimum degree. That is, I have found this combined advantage to exist if the ratio of the length L to the width W of the thin, wafer-shaped resistance body is approximately between the limits of 1.4 and 3.0. Denoted by L is the length of the long edges equipped with the Hall electrodes, whereas W denotes the length of the short edges of the resistance body along which the current supply electrodes are located. I have found that this narrow range for the ratio $L/W$ is critical in that below the value 1.4 the generated Hall voltage drops very steeply to a small and unsatisfactory value which no longer affords utilizing the high carrier mobility of the material, whereas if the value of the ratio $L/W$ goes appreciably beyond 3.0, the corresponding increase in the amount of semiconductor material does not increase the Hall voltage and thus involves waste of material and useless increase in the dimensions of the device. I have further found it preferable to make the ratio $L/W$ at least approximately equal to 2.

Figure 2:
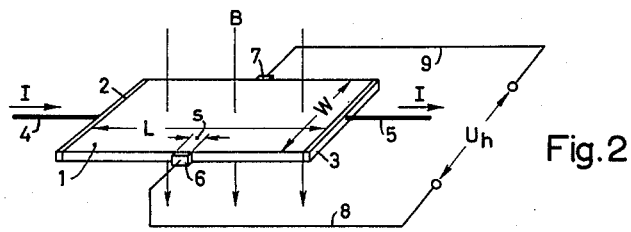
Figure 3:
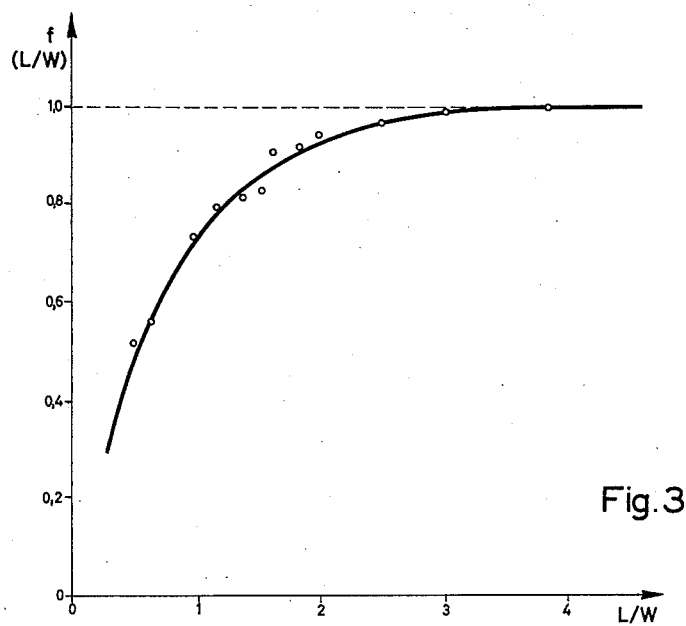

The invention will be further explained with reference to the embodiment illustrated on the drawing in which Fig. 1 shows a side view of a complete Hall generator, Fig. 2 shows schematically and in perspective the semiconducting resistance body of the same Hall generator, and Fig. 3 is a coordinate diagram explanatory of the invention.

The illustrated Hall generator comprises a broad-area or wafer-shaped resistance body 1, for instance of indium arsenide. The length of the body may be 15 mm., the width 8 mm., and the thickness 0.1 mm. Generally, such a resistance body consists preferably of a monocrystal of an $A_{III}B_V$ compound. The dimensions of the body, of course, may be varied. For instance, suitable dimensions are 2 to 15 mm. length, 1 to 8 mm. width, and 0.05 to 0.1 mm. thickness.

The wafer-shaped body 1 is provided with two current supply terminals 2 and 3 which form a line- or area-contact with the semiconducting material and extend over the entire width; that is, over the entire length of the short sides of the rectangular wafer. Current is supplied to the terminals 2 and 3 by respective wires 4 and 5 leading to a current source (not illustrated). Two Hall electrodes 6 and 7 are located in the middle of the two long sides of the wafer and are connected to respective leads 8 and 9 from which the Hall voltage $U_h$ can be taken off for energizing a load (not illustrated), for instance a relay, magnetic amplifier or other device requiring a certain amount of current consumption in its input circuit. The two Hall electrodes 6 and 7 also form an area contact with the semiconductor body 1. That is, these two electrodes are elongated so that their length along the long edge of the wafer is larger than the thickness of the wafer. In the illustrated embodiment, the length $s$ of the Hall electrodes may amount to 0.5 mm. Since the length varies from 2 to 15 mm. as stated above, the ratio $S:L$ varies from 0.25 to 0.03. The optimum ratio is discussed below.

In the Hall generator the resistance body 1 is subjected to a magnetic field which in Fig. 2 is schematically illustrated by vertical arrows denoted by B. As shown in Fig. 1, this field is produced by means of a magnetic field structure 11 energized by a magnet coil 12. The semiconducting resistance body 1 is located between the pole faces of the field structure and is electrically insulated from these pole faces.

By virtue of the fact that the Hall electrodes 6 do not form point contacts but, similar to the current terminals, form a line- or area-contact with the semiconducting resistance body 1, a particularly accurate proportionality between the Hall voltage and the magnetic induction, when operating with a load in the Hall-voltage output circuit, is achieved provided the above-mentioned limit conditions for the ratio $L/W$ are satisfied. Generally, the length $s$ of the Hall electrode, though shorter than the length $L$ of the resistance body, must be in the same decimal order of magnitude. However, I have found that, with the ratio $L/W$ of 1.4 to 3.0 according to the invention, an especially close approach to a strictly linear proportionality of the Hall voltage to the product of B and I is secured if the ratio of the length $s$ of a Hall electrode to the length $L$ of the resistance body is equal to 0.1 or is at least approximately 0.1.

Another advantage afforded by the resistance dimensioning according to the invention resides in the fact that it leads also to advantageous dimensions of the magnetic fields that are inductively effective upon the semiconductor body, or of the pole shoes of a magnetic circuit that produces such a field. As a result, it becomes possible to utilize the air gaps of commercially available magnet cores over their entire cross-sectional area. This obviates the necessity of using for the Hall generators an unpractical, special design for the magnet core. As mentioned, I have found it preferable to make the resistance body in Hall generators according to the invention of indium arsenide. This material has a Hall constant $R_h$ equal to about 120 cm.$^3$/amps. sec., and has a carrier mobility above 20,000 cm.$^2$/volt sec.

The invention will be more fully understood from the considerations and observations presented presently.

As mentioned, the above-presented equation for the no-load Hall voltage $U_h$ is strictly correct only for a Hall wafer of infinite length and hence applies to cases in which the ratio $L/W$ is very much larger than unity. In Hall specimens of square shape; that is, wafers whose ratio $L/W$ is in the order of magnitude of 1, the influence of the current supply terminals cannot be neglected. Due to the fact that the terminals extend over the entire edges and consist of an electrode material of great electric conductivity and slight carrier mobility, they form lines of fixed electric potential (equi-potential lines) and act as a short circuit for the Hall field at the ends of the specimen. As a result, if the length of the specimen is finite, the theoretically full Hall field can no longer occur in the middle of the specimen where the Hall electrodes are located. Consequently, for cases of finite length of the specimen, the above-presented equation must be replaced by the more general relation:

$$U_{h0} = R_h \frac{B \cdot I}{d} f(L/W)$$

In this equation, the function $f(L/W)$ for finite values of $L/W$ is smaller than 1 and approaches the value 1 asymptotically with increasing values of $L/W$.

The diagram of Fig. 3 shows the curve of this corrective function $f(L/W)$ as determined by measurements. These tests were carried out on an InAs specimen with a Hall constant $R_h=120$ cm.$^3$/amp. sec. in a magnetic field of 5000 gauss. During the tests the controlling current I passing through the Hall specimen between the wires 4 and 5 (Fig. 2) amounted to 100 milliamps. It is apparent from the diagram that, starting from high $L/W$ values, the function $f(L/W)$ at first decreases very slowly. The value of the no-load Hall voltage shows a corresponding slow decrease. With a ratio $L/W=2$, this value has declined only by an amount of less than 10%. However, the decline makes itself felt to a steeply increasing degree, namely so that with a specimen of square shape, that is for a ratio $L/W=1$, only about 75% of the Hall voltage of an elongated specimen are attained. It will be recognized from the diagram that when the ratio $L/W$ drops below a value of about 1.4, the generated Hall voltage is very small. Indeed, this voltage may then no longer be favorably distinguished from the Hall voltage obtainable with semiconducting substances, such as germanium, of much lower carrier mobility so that the advantages of the high-mobility compounds can no longer be realized. On the other hand, it will be seen that the curve is of the type of a saturation characteristic. That is, when the ratio $L/W$ increases above 3.0 a considerably larger expenditure in semiconducting material and a correspondingly larger size of the semiconductor body will result without any appreciable increase in Hall voltage.

I claim:

1. A broad-area resistor for a Hall generator, comprising a resistor body of a semiconductor compound having a carrier mobility above 6000 cm.$^2$/volt second, said body having elongated wafer shape, current supply terminals extending over an elongated area along the short sides of the wafer, elongated Hall electrodes located on the respective long sides of the wafer and having a length shorter than the length of said long sides, said long sides and said short sides having a length ratio between about 1.4 and 3.0.

2. A broad-area resistor for a Hall generator, comprising a resistor body of a semiconductor consisting of a binary compound of the type $A_{III}B_V$ of respective elements from the third and fifth groups of the periodic system and having a carrier mobility above 6000 cm.$^2$/volt second, said body having elongated wafer shape, current supply terminals extending substantially along the entire length of the short sides of the wafer, elongated Hall electrodes located on the respective long sides of the wafer and having a length of at least one tenth of, but only a minor fraction of, the length of said body, said long sides and said short sides of the wafer having a length ratio of about 1.4 to 3.0.

3. A broad-area resistor for a Hall generator, comprising a resistor body of a semiconductor of indium arsenide having elongated wafer shape, current supply terminals having area contact with said body along the short sides of the wafer, Hall electrodes mounted on the two respective long sides of the wafer and having area contact therewith over a length in the ratio range with respect to the length of said long sides of about 0.25 to 0.03, said long sides and said short sides having a length ratio between about 1.4 and 3.0.

4. A broad-area resistor for a Hall generator, comprising a resistor body of a semiconductor compound having a carrier mobility above 6000 cm.$^2$/volt second, said body having elongated wafer shape, current supply terminals having area contact with said body along the short sides of the wafer, Hall electrodes mounted on the two respective long sides of the wafer and having area contact therewith over a length in a ratio with respect to the length of said long sides of about one tenth, said long sides being approximately twice as long as said short sides.

5. A broad-area resistor for a Hall generator, comprising a resistor body of a semiconductor having a carrier mobility above 6,000 cm.$^2$/volt second, said body having elongated wafer shape, current supply terminals having area contact with said body along the short sides of the wafer, Hall electrodes mounted on the two respective long sides of the wafer and having area contact therewith over a length in the ratio range with respect to the length of said long sides of about 0.25 to 0.03, said long sides and said short sides having a length ratio between about 1.4 and 3.0.

6. A broad-area resistor for a Hall generator, comprising a resistor body of a semiconductor consisting of a binary compound of the type $A_{III}B_V$ of respective elements from the third and fifth groups of the periodic system and having a carrier mobility above 6000 cm.$^2$/volt second, said body having elongated wafer shape, current supply terminals having area contact with said body along the short sides of the wafer, Hall electrodes mounted on the two respective long sides of the wafer and having area contact therewith over a length in the ratio range with respect to the length of said long sides of about 0.25 to 0.03, said long sides and said short sides having a length ratio between about 1.4 and 3.0.

7. A broad-area resistor for a Hall generator, comprising a resistor body of a semiconductor compound of an element taken from the group consisting of aluminum, gallium, and indium and an element taken from the group consisting of phosphorus, arsenic, and antimony, said compound having a carrier mobility above 6000 cm.$^2$/volt second, said body having elongated wafer shape, current supply terminals extending over an elongated area along the short sides of the wafer, elongated Hall electrodes located on the respective long sides of the wafer and having a length shorter than the length of said long sides, said long sides and said short sides having a length ratio between about 1.4 and 3.0.

8. A broad-area resistor for a Hall generator, comprising a resistor body of a semiconductor of indium arsenide having a carrier mobility above 6000 cm.$^2$/volt second, said body having elongated wafer shape, current supply terminals having area contact with said body along the short sides of the wafer, Hall electrodes mounted on the two respective long sides of the wafer and having area contact therewith over a length in a ratio with respect to the length of said long sides of about one tenth, said long sides being approximately twice as long as said short sides.

9. A broad-area resistor for a Hall generator, comprising a resistor body of a semiconductor compound having a carrier mobility above 6000 cm.$^2$/volt second, said body having elongated wafer shape, current supply terminals extending over an elongated area along the short sides of the wafer, elongated Hall electrodes located on the respective long sides of the wafer and having a length shorter than the length of said long sides, said long sides and said short sides having a length ratio between about 1.4 and 3.0, the length being taken from the range of about 2 to 15 mm., the width of the said shorter sides being taken from the range of 1 to 8 mm., and the thickness varying between about 0.05 to 0.1 mm.

10. A broad-area resistor for a Hall generator, comprising a resistor body of a semiconductor of indium arsenide having elongated wafer shape, current supply terminals having area contact with said body along the short sides of the wafer, Hall electrodes mounted on the two respective long sides of the wafer and having area contact therewith over a length in the ratio range with respect to the length of said long sides of about 0.25 to 0.03, said long sides and said short sides having a length ratio between about 1.4 and 3.0, the length being taken from the range of about 2 to 15 mm., the width of the said shorter sides being taken from the range of about 1 to 8 mm., and the thickness varying between about 0.05 to 0.1 mm.

11. A broad-area resistor for a Hall generator, comprising a resistor body of a semiconductor compound of an element taken from the group consisting of aluminum, gallium, and indium and an element taken from the group consisting of phosphorus, arsenic, and antimony, said compound having a carrier mobility above 6000 cm.$^2$/volt second, said body having elongated wafer shape, current supply terminals extending over an elongated area along the short sides of the wafer, elongated Hall electrodes located on the respective long sides of the wafer and having a length shorter than the length of said long sides, said long sides and said short sides having a length ratio between about 1.4 and 3.0, the length being taken from the range of about 2 to 15 mm., the width of the said shorter sides being taken from the range of about 1 to 8 mm., and the thickness varying between about 0.05 to 0.1 mm.

References Cited in the file of this patent
UNITED STATES PATENTS

| | | |
|---|---|---|
| 1,778,796 | Craig | Oct. 21, 1930 |
| 2,562,120 | Pearson | July 24, 1951 |
| 2,714,182 | Hewitt | July 26, 1955 |
| 2,725,504 | Dunlap | Nov. 29, 1955 |
| 2,736,822 | Dunlap | Feb. 28, 1956 |